(12) United States Patent
Rolle et al.

(10) Patent No.: US 9,268,573 B2
(45) Date of Patent: Feb. 23, 2016

(54) METHODS FOR DECODING AND DISPATCHING PROGRAM INSTRUCTIONS

(71) Applicants: Michael Rolle, Cupertino, CA (US); Stanley Goldberg, San Francisco, CA (US)

(72) Inventors: Michael Rolle, Cupertino, CA (US); Stanley Goldberg, San Francisco, CA (US)

( * ) Notice: Subject to any disclaimer, the term of this patent is extended or adjusted under 35 U.S.C. 154(b) by 42 days.

(21) Appl. No.: 13/667,192

(22) Filed: Nov. 2, 2012

(65) Prior Publication Data

US 2014/0129205 A1   May 8, 2014

(51) Int. Cl.
*G06F 15/177* (2006.01)
*G06F 9/30* (2006.01)

(52) U.S. Cl.
CPC .................................. *G06F 9/30156* (2013.01)

(58) Field of Classification Search
CPC ............... G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | |
|---|---|---|---|
| 2002/0124239 A1* | 9/2002 | Nelson ...................... G06F 9/44 717/140 |
| 2006/0195830 A1* | 8/2006 | Smith et al. .................... 717/151 |
| 2006/0259878 A1* | 11/2006 | Killian et al. ...................... 716/1 |
| 2007/0094646 A1* | 4/2007 | Higham ........................ 717/136 |
| 2008/0168429 A1* | 7/2008 | Burdick et al. ............... 717/130 |
| 2010/0174884 A1* | 7/2010 | Morishita ........... G06F 9/30014 712/15 |
| 2011/0066419 A1* | 3/2011 | Chiou ............................ 703/14 |
| 2011/0066820 A1* | 3/2011 | Blundell et al. .............. 711/163 |
| 2012/0144376 A1* | 6/2012 | Van Eijndhoven et al. ... 717/146 |
| 2012/0284701 A1* | 11/2012 | Tsai et al. ...................... 717/151 |

OTHER PUBLICATIONS

Purnaprajna et al., Runtime Reconfiguration of Multiprocessors Based on Compile-Time Analysis, 2010.*

* cited by examiner

*Primary Examiner* — Wei Zhen
*Assistant Examiner* — Zhan Chen
(74) *Attorney, Agent, or Firm* — Dergosits & Noah LLP; Todd A. Noah

(57) ABSTRACT

Methods for encoding a program. Each program instruction in a program has one or more possible encodings, and each instruction encoding may have a different length. The instruction encodings are selected such that the resulting encoding of the program as a whole minimizes the number of program cycles used in a decoding stage of a processor. Instruction padding or program padding may be used to create instruction encodings of lengths.

12 Claims, 11 Drawing Sheets

FIG. 3B

*RECORD TYPES*

Src 301

State 302
*Fields:*
PC
PI
IP
DC
DN
PS

Instr 303
*Fields:*
ST
GS
PL
PE
NM
M
S
L
E

Macr 302
*Fields:*
I
DC
DP
N

*OTHER VARIABLES*

P (list of Src)
ST (state)
IL (list of Instr)
I (→ Instr)
ML (list of Macr)
M (→ Macr)
ODC
M0 ⎫
M1 ⎬ (→ Macr)
M2 ⎭
PD
DS

METHODS FOR DECODING AND DISPATCHING PROGRAM INSTRUCTIONS

TECHNICAL FIELD

This disclosure relates generally to the field of microcomputer architecture, and more particularly, to methods for efficient object code generation.

BACKGROUND

One key function of a compiler in computer architecture is to generate object code (or machine code) from a particular sequence of program instructions, i.e., any type of software program or module, whether in a high-level language, assembler language or previously-compiled machine code. The object code is then read by a processor, where the instructions are executed.

However, object code is sometimes inefficient in its use of computer resources, resulting in longer times to execute the program. Two areas of inefficiency are particularly problematic and are addressed by this disclosure.

(1) If the processor has an instruction decoder that limits the instructions processed each cycle based on the locations of the instruction bytes, then the decoder might not decode instructions as quickly as they can be executed by the processor. Examples are AMD and Intel x86-based CPUs that use two aligned 16-byte sets of instruction bytes each cycle.

(2) A processor typically has a load/store unit, which serves to move data in both directions between the execution unit and the data cache. Sometimes the program is slowed down because the load/store unit fails to achieve the full throughput of which it is capable, due to idiosyncratic behavior of the load/store unit for certain programs. An alteration of the program as described herein can avoid this behavior and achieve full throughput. In particular, the AMD Family 10h processors, and other processor families with similar architecture (referred to hereafter as K10), have a significant bottleneck at the load/store unit, for which a specific remedy is disclosed herein. The AMD Family 15h processors (referred to hereafter as K15), and other processor families with similar architecture, are known to have a different bottleneck. However, the general approach given in this disclosure may be used to improve program performance on these processors as well.

Thus, it would be desirable to have a technique which improves program performance on these processors and maximizes the number of instructions that can be performed during each processor cycle.

BRIEF DESCRIPTION OF THE DRAWINGS

FIG. 3B is a block diagram illustrating record types, variables and parameters used in the methods of FIGS. 3A and 3C-3F.

DETAILED DESCRIPTION

1. Terminology

Figure 1:
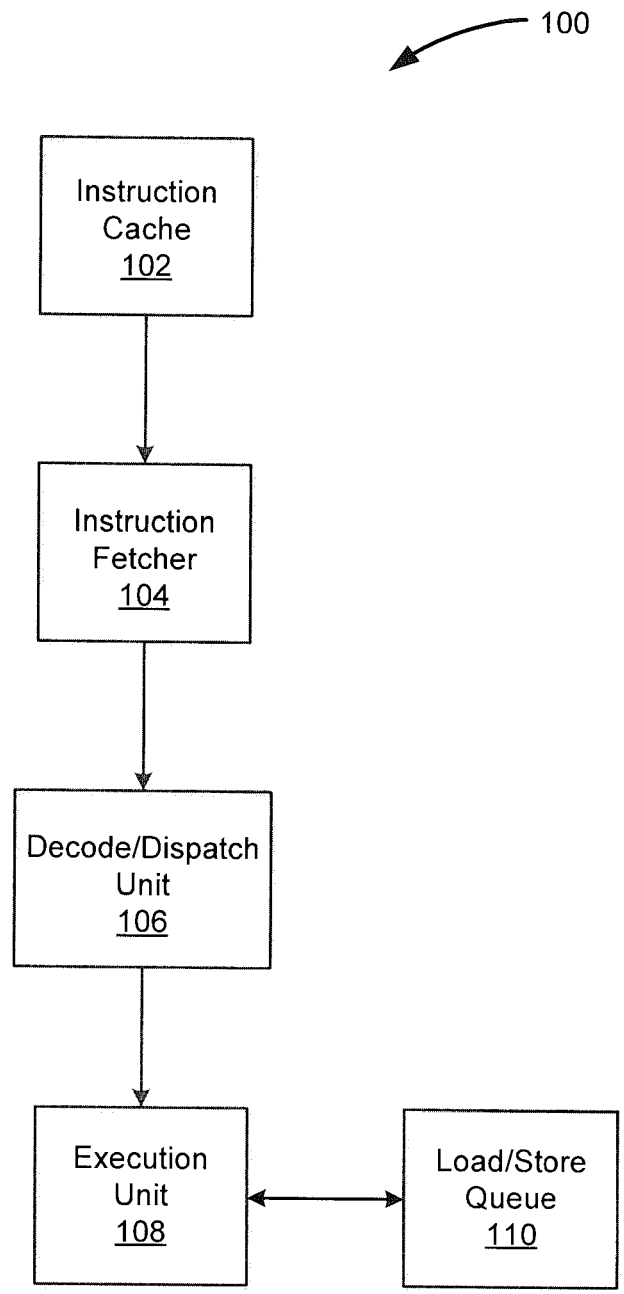
FIG. 1 is a flow chart illustrating a simplified core execution process.

Target, or Target Platform: A specific type of computer processor which reads data in an instruction memory, interprets the data as computational actions, and performs them in sequence. The platform may be a collection of different types of processors, all of which interpret the instruction memory in an identical manner.

Program Instruction: A single computational action in a program, according to the software architecture definition for the target platform. The instruction is specified by the operation performed and the location(s) of its operand(s).

Instruction Encoding: Any of several different data values in instruction memory that cause a given program instruction to be performed by the processor. On a target platform with variable length encodings (such as the x86 or AMD64 architectures), different encodings for the same instruction may have different lengths.

K10: An AMD processor core with a family code of 10h, or any other family with a similar micro-architecture (including AMD families 11h and 12h, but not 15h).

K15: An AMD processor core with a family code of 15h, or any other family with a similar micro-architecture.

Optimization Guide: The document titled *Software Optimization Guide for AMD Family 10h and 12h Processors*, Rev. 3.13, published by AMD in 2011.

Macro op or execution op (xop): A function for the execution unit to perform, generally encoded as a fixed size set of bits. A single instruction may be performed by a plurality of xops. Macro op is the term used in AMD publications, and different terms may be used by other manufacturers.

Micro op (or uop): A function that performs part of a xop in a particular component of the execution unit, such as address generation, load/store, or a floating point operation. A single xop may be performed by a plurality of uops.

Program: A series of program instructions which are performed in order, other than when some instructions may jump to another instruction in the program. The emphasis of this disclosure is the improvement in execution speed of a program which contains no jumps.

Program generator: A method of producing a program which will perform a specified computation. Typically the computation is specified by some form of "source code" and the program generator is known as a compiler or an assembler. In this disclosure, the program generator could also be a person who produces a program given a specification in any suitable form.

Functionally equivalent programs: A plurality of different programs (i.e., different sequences of program instructions) which all produce the same computational result when executed. Some program generators are capable of producing a plurality of functionally equivalent programs for the same source code, in order to evaluate each of these programs and select a "best" one (according to any suitable criterion) as its final result.

Program encoding: The result of translating a program, wherein the program instructions are each given an instruction encoding and these encodings are located adjacent to each other in instruction memory.

Functionally equivalent program encodings: A plurality of program encodings which all produce the same computational result when executed. This may include program encodings of different programs or different program encodings of the same program, or both.

Optimizing: A method of producing a plurality of functionally equivalent program encodings, evaluating the execution speed of each of them on a target platform, and then selecting a program encoding which has the greatest speed. This does not mean that the selected program encoding will have the greatest speed of all possible functionally equivalent program encodings.

Decoder: The portion of a processor core in which instruction data are converted (or decoded) into xops and forwarded to the execution portion of the core.

Decode Window: a set of data of a fixed size, copied from a range of consecutive addresses in instruction memory. The start address may be aligned to a multiple of that fixed size. Many processors, including most AMD and Intel processors, can decode only those instructions fully contained in a fixed number of decode windows in each processor cycle.

Dispatch: The action by the decoder of forwarding xops to the execution portion of the core.

Dispatch Pipe: One of a fixed number of components of the execution unit, each of which may receive a single xop from the decoder in each cycle.

Dispatch Bubble: Any occurrence of a dispatch pipe not receiving any xop in a cycle.

Padding: A method of creating a functionally equivalent program encoding to a given original program encoding, in order to increase the decoding speed. There are two specific forms of padding discussed in this disclosure:

Program padding: An instructions is inserted into the original program that has no computational effect (known as a nop). An instruction encoding is selected for the inserted nop, and the instruction encodings of the original program instructions are preserved.

Instruction padding: A different instruction encoding is selected for one of the program instructions, usually with a greater length, and the instruction encodings of the other program instructions are preserved.

2. Simplified Instruction Dispatch Model

FIG. 1 is a simplified illustration of a typical core portion 100 of a central processing unit (CPU) as used for virtually any microprocessor-based system. Program instructions are held in an instruction cache 102, where they may be retrieved by an instruction fetcher 104, then fed to the decoder/dispatch unit 106, where they are transformed into a suitable format (referred to as an xop) to be finally dispatched into an execution unit 108. One program instruction may result in more than one xop, and more than one xop may be transmitted to the execution unit 108 in a processor cycle. Coupled to the execution unit 108 is a load/store unit 110, which performs memory operations received from the execution unit 108 by moving data between the execution unit 108 and a data cache 112.

FIG. 2 illustrates the use of instruction padding and program padding to increase the number of instructions dispatched in each cycle. This specific example applies to a target platform with two aligned 16-byte decoder windows, three xops dispatched per cycle, and all instructions dispatching exactly one xop each. However, the principle could be applied in other configurations as well.

Figure 2A:
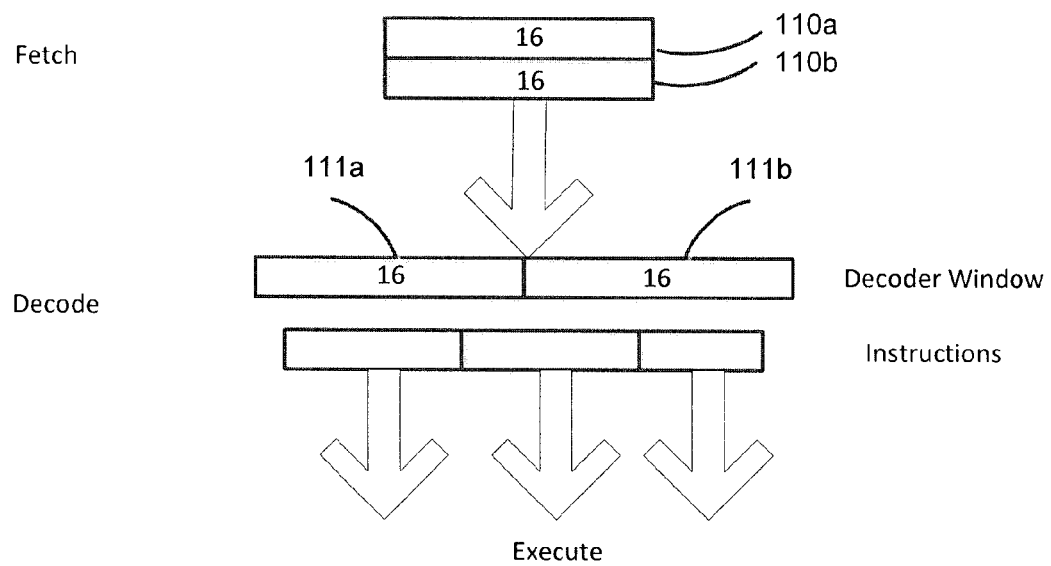
FIGS. 2A-2E are block diagrams illustrating how instructions are aligned within a decoder window.
Figure 2B:
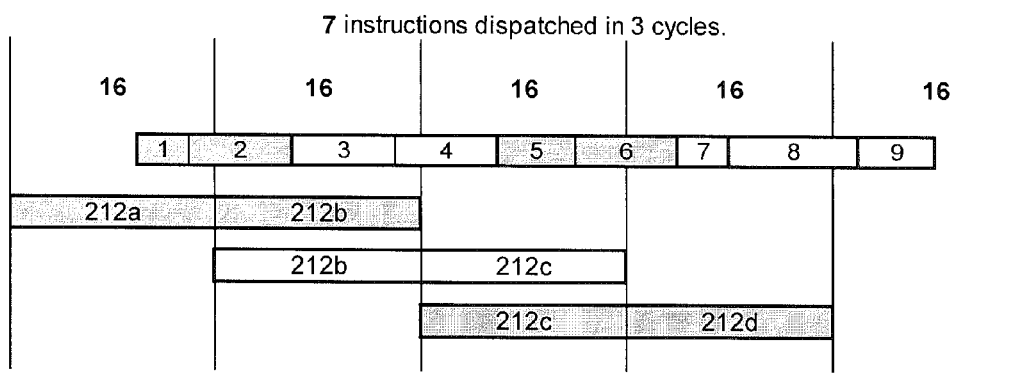

Instruction data (program code) is fetched from instruction memory into the decoder unit 106 as a number of instruction bytes, which are fit into decoder windows. For example, as shown in FIG. 2A, decoder 106 receives instruction bytes from two 16-byte windows 110a, 110b in fetcher 104, and fits them into two 16-byte windows 111a, 111b, where the next instructions to be decoded start somewhere in the first window 111a and may extend as far as the end of the second window 111b. The decoder 106 has an instruction pointer indicating where in the first window the next instruction begins. The decoder 106 then converts one or more instructions into several xps, dispatches these to execution unit 108, and advances the instruction pointer past those instructions that it converted. If the new instruction pointer is now in the second window, this will become the new first window and a new second window will be provided by fetcher 104. If the new instruction pointer is at the end of the second window, then two new windows will be provided by fetcher 104.

In some cases, the decoder 106 cannot dispatch as many xops as execution unit 108 can receive, because the necessary instructions are not wholly contained within the current decoder windows. For example, in FIG. 2B, only 7 instructions are dispatched within 3 processor cycles, as follows. Instructions 1, 2 and 3 fit within the first two windows 212a and 212b and are dispatched in a first cycle. Another window 212c is fetched, along with instructions 4 and 5. Since there is still room in window 212b, instruction 4 begins there and extends into window 212c followed by instruction 5. Instruction 6 extends beyond window 212c and therefore cannot be dispatched with instructions 4 and 5 in this example, and, only instructions 4 and 5 are dispatched in a second cycle. Another window 212d is fetched, along with instructions 6 and 7, which are fit into windows 212c and 212d. Instruction 8 extends beyond window 212d. Therefore, only instructions 6 and 7 are thus dispatched in a third cycle, and instructions 8 and 9 are left to be dispatched in a fourth cycle.

Figure 2C:
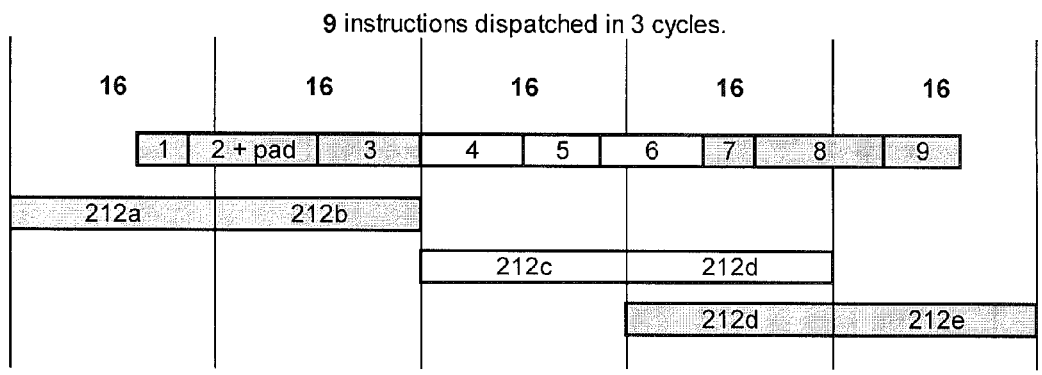

However, this can often be remedied by instruction padding. It uses alternate, and longer, equivalents to some earlier instructions, provided that no earlier instructions are caused to extend beyond their second dispatch windows. For example, FIG. 2C illustrates a scenario in which all 9 instructions are dispatched in 3 cycles simply by replacing instruction 2 with a different encoding that is a little longer, i.e., by padding the instruction. Instructions 1, 2 and 3 are fit within windows 212a and 212b and are dispatched in cycle 1. Because of the padding to instruction 3, instruction 4 now begins at the start of window 212c. Windows 212c and 212d are now fetched, and instruction 5 as well as instruction 6 now also fit within these two windows and are dispatched in cycle 2. There is still room in window 212d, and window 212e is now fetched. Instructions 7, 8 and 9 fit within windows 212d and 212e and are dispatched in cycle 3. The method for choosing different length instruction encodings, is one of the key subjects of this disclosure.

Figure 2D:
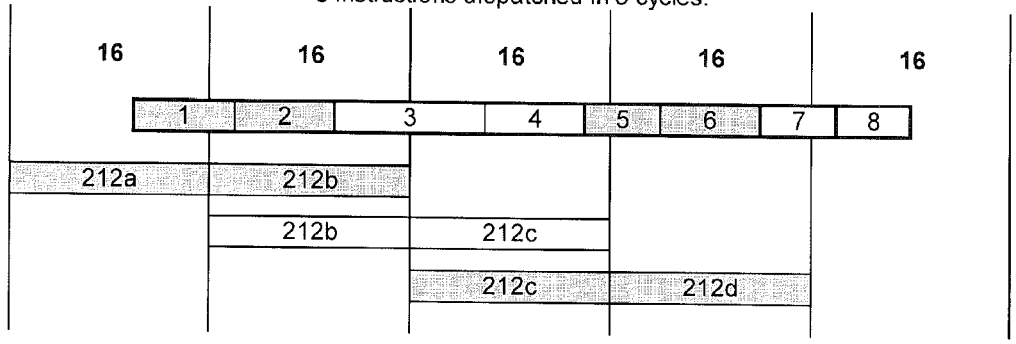

In another example, program padding is employed. Referring to FIG. 2D, it is not possible to pad anything before Instruction 3, so that Instruction 3 would begin in the second window 212b. Furthermore, Instruction 5 extends beyond window 212c, and Instruction 7 extends beyond window 212d. The result is that only 6 instructions are dispatched in the first three cycles.

Figure 2E:
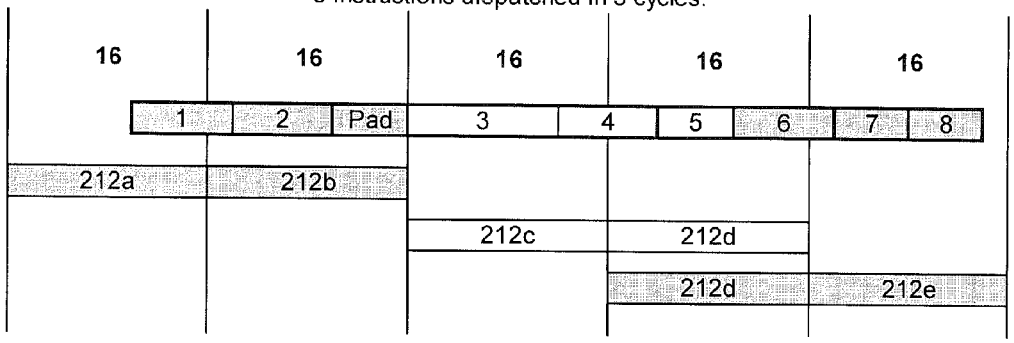

FIG. 2E illustrates program padding in order to dispatch 8 instructions in the first three cycles. It is not possible to dispatch Instruction 3 in the first cycle. However, it is possible to dispatch Instruction 5 in the second cycle. The padding is done by adding a NOP instruction after Instruction 2. On a target such as K10 or K15, a NOP instruction may be up to 11 bytes in length without impacting the decoder performance. By selecting the right length for Instruction 2b, and also by possibly padding some earlier Instructions, the end of Instruction 2b is exactly at the end of window 212b. In the second cycle, windows 212c and 212d are both fetched, and now Instructions 3, 4 and 5 are all dispatched in the second cycle. Then, window 212e is fetched, and Instructions 6, 7, and 8 are all dispatched in the third cycle. The result is not as good as in FIG. 2C, but it is the best that can be achieved in this example.

With a combination of instruction padding and when necessary, program padding any program can be arranged in such a way as to be dispatched to the execution unit in the least possible time.

Most x86 instructions can be extended by 1 or more bytes by adding prefix bytes that do not alter the behavior of the instruction. However, the processor may have a limit on the prefix bytes that can be present in order for the decoder to operate at full efficiency, thus placing limits on the amount that a particular instruction may be extended by.

Any x86 instructions that have either a displacement field (i.e. a memory operand) or an immediate field can be coded to have longer fields, thus adding as many as 4 bytes to the instruction length.

3. Method for Generating Efficiently Dispatched Machine Code

Figure 3A:
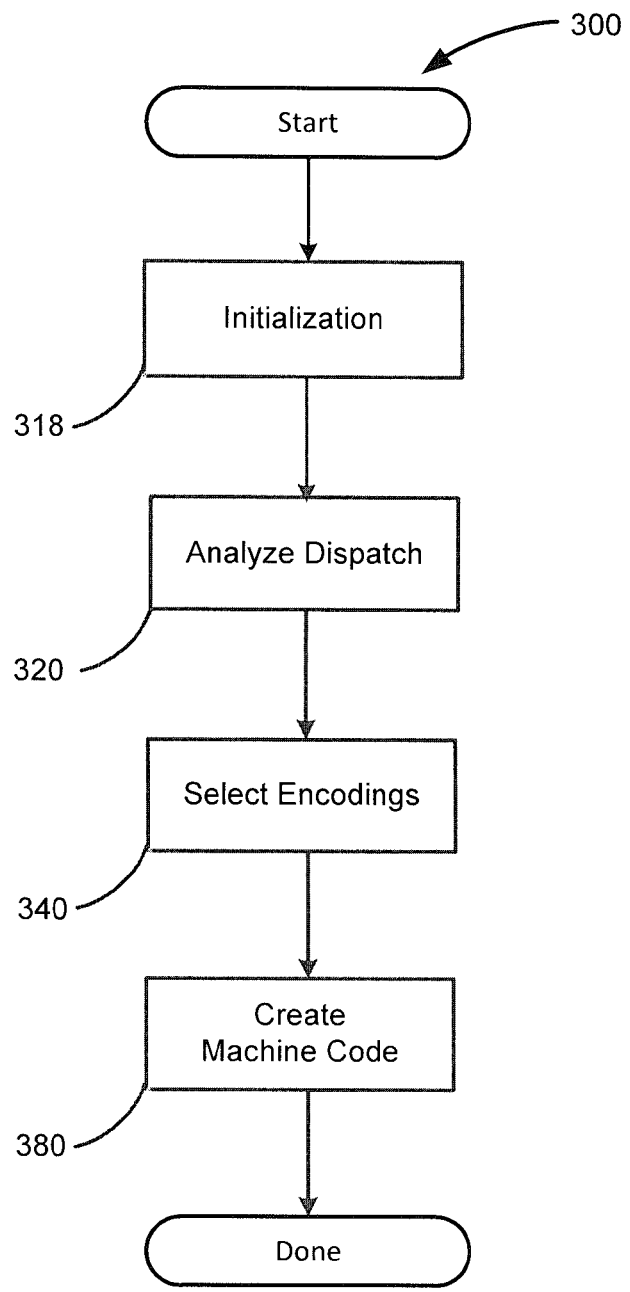
FIGS. 3A and 3C-3F are flow charts illustrating one embodiment of a method for coding and dispatching instructions into the execution unit.

Referring now to FIG. 3A, a process 300 is illustrated for converting a given program into program code, with instruction padding and program padding, that is efficiently dispatched from the decoder 106 to the execution unit 108. The process 300 as described is specifically tailored to the K10 processor, but this example is intended to be illustrative only and not limiting. The process 300 has four main steps:
 (i) initialization in step 318;
 (ii) analysis of dispatch possibilities in subprocess 320;
 (iii) selection of encodings in subprocess 360; and
 (iv) creation of machine code in subprocess 380.

In addition to simply producing code that is efficiently dispatched, an important application of process 300 is producing an optimized program P, when the performance of the program depends upon the schedule of dispatch of operations from the CPU's decoder to its execution unit. At any point in the program P, say point N, the dispatch schedule for the sequence of instructions $P_0$ through $P_{N-1}$ can be used to simulate the execution of the program. Using the result of the simulation, the program generator can back up the process to an earlier instruction, for example $P_M$, and continue with a different sequence of instructions $P_{M+1}$, $P_{M+2}$, etc.

In particular, process 300 is used for optimizing the K10 Load/Store Unit, which is detailed elsewhere in this disclosure. The performance of the Load/Store Unit is highly dependent upon the exact schedule of operation dispatches.

Subprocess 320 can operate concurrently with a program generator and/or a simulation of the program. The instruction generator can provide the input program instructions as subprocess 320 needs them. Subprocess 320 can also be rolled back to an earlier point in the program, allowing the instruction generator to proceed with a different program.

An option associated with process 300 is to preserve the dispatch positions of all program instructions. That is, all xops will be dispatched in the same dispatch positions as they would be if there were no window-related dispatch bubbles. This is for code that depends on these positions for any reason whatsoever, such as optimization.

A program is provided to process 300 from an external source (the program generator), including some initial conditions for the program, and some other options and parameters. The program is a sequence of program instructions, denoted $P_0$, $P_1$, $P_2$ . . . , and the program may be provided entirely when process 300 is invoked, or it can be provided "on-demand" in sequence as subprocess 320 runs. Before describing the process 300 in detail, the data records, parameters and variables used by process 300 are defined, as shown in FIG. 3B.

A first record type "Src" 301 encapsulates a single program instruction of the program P. It describes an x86 machine instruction by specifying the operation performed and the location(s) of its operand(s), in enough detail so that one or more equivalent instruction encodings for the instruction can be produced.

A second data record type "State" 302 tracks the status of the CPU dispatcher as it proceeds through program P, and contains the following fields: PC, PI, IP, DC, DN, PS. The field PC is a program counter and counts the number of Src 301 records already processed. The field PI refers to the next program instruction Src 301 record to be processed, or (null). This value will be $P_{PC}$ if it exists. The field IP is true if an extra NOP instruction should appear in the resultant code at this point. The field DC refers to the dispatch cycle for the next xop. The field DP refers to the dispatch pipe for the next xop, and will have a value from 0 to 2. The field PS refers to possible starting offsets in the current pair of decoder windows, for the next instruction's encoding, and will be a value in the set of numbers in the range {0-32}.

The third data record type "Instr" 303 is used to represent encoding information for an instruction. This instruction may be contained in P, or it may be an extra NOP instruction for program padding. An Instr 303 record contains the following fields: ST, GS, PL, PE, NM, M, S, L, E. Field ST is a State 302 record for the point at which the instruction's first xop is dispatched. Field GS is True if the instruction starts a new dispatch group. Field PL represents possible lengths of encoding, with a value in the range {1-15}. Field PE represents possible ending offsets in the current pair of decoder windows, and has a value of the range {1-32}. Field NM refers to the number of xops. Field M refers to the first xop (i.e., the Macr 304 record) for this instruction. Field S refers to a selected encoding length, and is an element of ST.PS. Field L refers to a selected encoding length, and is an element of PL. Field E refers to a selected encoding length, and is an element of PE.

A fourth data record type "Macr" 304 represents an xop dispatched to the execution unit, and contains the following fields: I, DC, DP, N. Field I refers to the instruction for which this Macr 304 record is dispatched. Fields DC and DP refer to the next xop dispatch cycle and the next xop dispatch pipe, respectively, i.e., the same meaning as the State field of the same name. Field N is a sequence, starting with 1, of all Macr 304 records with the same instruction.

Process 300 also has a number of parameters and internal variables, as shown in FIG. 3B. The internal variables include P, which is the input program, $P_1$, $P_2$, etc., as provided by the program generator via process step 323 to extend the program (see description below). P may also be shortened in process step 332. Variable ST is the State record for the current point during subprocess 320 to analyze dispatch possibilities (see description below). Field ST.PI references an internal NOP record if ST.IP is true. Variable IL is a list of instruction objects from record Instr 303, denoted $IL_1$, $IL_2$, etc. Variable I refers to an instruction belonging to the list IL, or (null). Variable ML is a list of objects from record Macr 304, denoted $ML_1$, $ML_2$, etc., which are formed in subprocess. Variable M refers to an object belonging to the list ML, or (null). Variable ODC refers to the old dispatch cycle, which is the value of ST.DC at the end of the previous iteration of the Analyze Dispatch loop of step 320. Variables M0, M1 and M2 refer to objects in records Macr 304 for a xop (if any) dispatched in each of the dispatch pipes. A (null) value means no xop has been dispatched to that pipe. Variable PD is True if the process is in "preserve dispatch position" mode, as designated by the program generator. Variable DS is True if a dispatch stall has been signaled by the program generator.

Initialization takes place in step 318. This step sets the process variables in accordance with the parameters provided by the program generator. The first parameter is the "initial dispatch window offset," stored in variable P, or a set of possible offsets, stored in the field ST.PS. Note that the field ST.PS should only contain numbers in the range {0-15}, and smaller numbers have a greater chance of avoiding any padding NOPs. The second parameter is the "initial dispatch position," stored in the field ST.DP. The third parameter is the "preserve dispatch position" mode, which is optional, and stored in the variable PD.

Other variables and fields initialized in step 318 are: ST.PC=1, ST.DC=1, P, IL and IM={empty lists}, ST.PI, I and M=(null).

In subprocess 320, the dispatch of xops is analyzed. Subprocess 320 involves an iterative process, in which each iteration normally identifies one dispatched xop, in dispatch cycle sequence and in the dispatch pipe sequence within a dispatch cycle. Usually the xop comes from program P, but occasionally, it will be a program padding NOP. Occasionally, an iteration will produce a dispatch bubble.

Figure 3C:
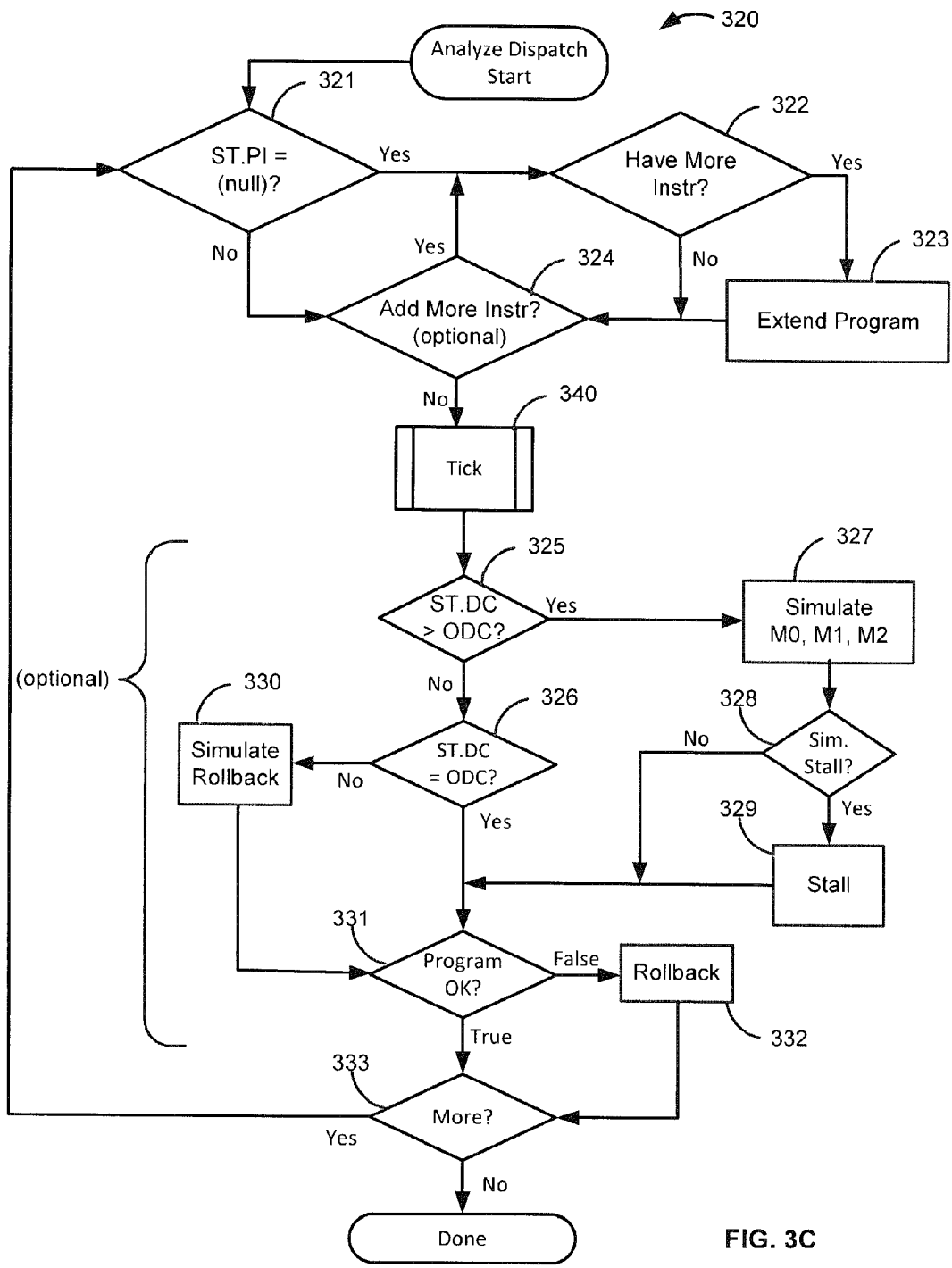

Referring to FIG. 3C, subprocess 320 is described in more detail. The functions shown in FIG. 3C may be invoked by the program generator. In step 321, if the field ST.PI is (null), then one instruction must be added to extend the program in step 323. First the program generator determines in 322 if it actually has more instructions. In step 324, the program generator has the option to supply any number of additional Instructions at this time.

Step 323 is invoked by the program generator with sufficient information to create a data record of type Src 301. This record Src 301 is created and added to the end of the program P. If ST.PI=(null), then set ST.PI=a reference to this created record.

In step 340, the "Tick" subprocess is performed. The Tick subprocess 340 is detailed further in FIG. 3D, described below. After the Tick subprocess 340 runs, the dispatch clock can be examined in steps 325 and 326 from the field ST.DC (the current cycle) and variable ODC (the ST.DC after the previous Tick run). If ST.DC>ODC, this means that cycle ODC is complete, and the xops dispatched (if any) have been stored in the variables M0, M1 and M2 in the above Tick 340. Optionally, a simulation of the execution of these xops can then be performed in step 327. If the simulation results in a simulated dispatch stall condition in step 338, then a stall subprocess may be invoked in step 329. This will cause the next Tick subprocess 340 to end with ST.DC>ODC again, this time with no resultant xops.

If ST.DC<ODC in step 326, this means that subprocess 320 was rolled backward by step 331 after the previous Tick subprocess 340. Optionally, the program generator may roll back its simulation accordingly.

The rollback function in step 332 is invoked with an instruction number, N≥0. In step 332, all Src records 301 are removed from P starting with $P_N$. Set ST.DC=N and ST.PI=(null). Remove all Instr records i from the end of IL where i.ST.PC≥N, or i.ST.IP is true. Remove all Macr records from the end of ML that reference any Instr just removed. Set I and M=the new end of IL and ML (or (null) if the lists are empty).

In step 339, the program generator may evaluate, using any suitable method, the program processed so far. If it decides to do so, for any reason, then it will invoke a rollback subprocess 332 to go back to an earlier instruction. The program generator will thus remove program instructions after that point. It will begin to replace them with different ones in step 322.

In either case, in step 333, the subprocess evaluates whether to perform another iteration. This test is true if ST.PI is not (null), or if ST.DP>0. The latter case enables more iterations to create dispatch bubbles until the current group is complete. Otherwise, step the test 333 is false and subprocess 320 ends.

Figure 3D:
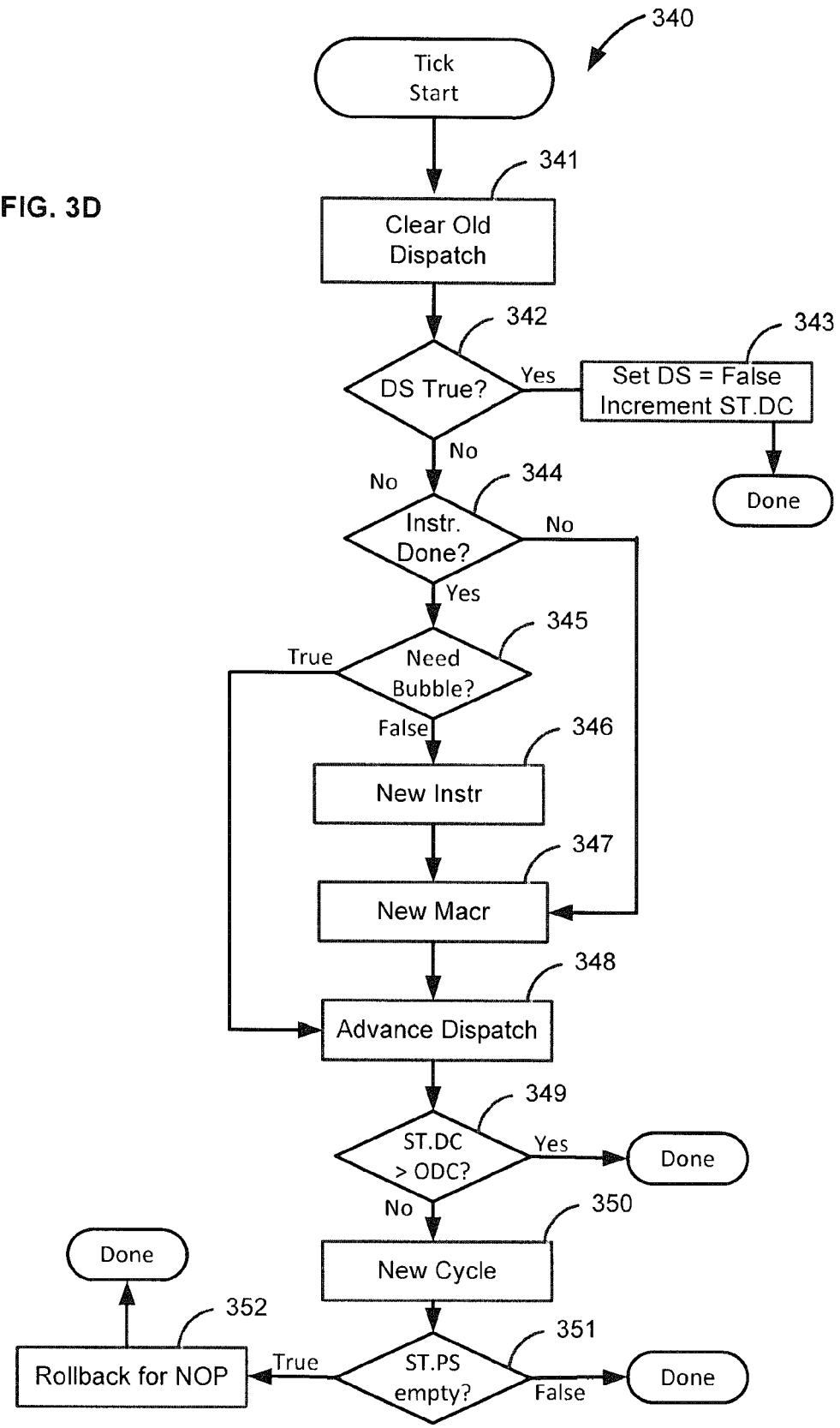

Referring to FIG. 3D, the Tick subprocess 340 is illustrated. In step 341, old dispatch values are cleared, and values are reset as follows: OCD=ST.DC, and M0, M1 and M2 are set to (null). In step 342, if DS is true, then in step 343, set DS to false, increment ST.DC, and end the Tick subprocess 340. However, if DS is false in step 342, then step 344 evaluates whether instruction processing is done. If ST.IP is true, the result is true. If ST.PC=0, the result is true (i.e., processing of the first instruction has not started yet). Otherwise the variable I references the current instruction and the variable M references the last xop dispatched for it. If M.N=I.NM, then test 344 is true, otherwise it is false. If 344 is false, then jump to step 347. If true, then go on to step 346.

Step 345 "Need Bubble" tests for rare cases where the next xop cannot be dispatched in the pipe designated by the current ST.DP. If ST.PC is true, skip this check. The special cases are: (i) If ST.PC>1 and $P_{ST.PC-1}$ is a VectorPath instruction, then pipe 0 is required; and (ii) If ST.PI is not (null) and is a VectorPath instruction, then pipe 0 is required. If it is one of those instructions, such as MUL (pipe 0) or POPCNT (pipe 2), that require a certain pipe, then this pipe is required. If the required pipe≠ ST.DP, then step 324 is true, and the subprocess jumps to step 327. Also, if ST.PI is (null), then step 324 is true.

In step 346, the variable I is set to refer to a new Instruction record, at the end of IL. The fields for I, and some fields of ST, are set as follows:

(i) Set I.GS=true if ST.DC>(previous I). ST.DC, or if the previous I is (null), otherwise set to false.

(ii) If I.GS is true, then set ST.PS=the set of all remainders of numbers in ST.PS when divided by 16. In math notation, this is ST.PS={n ∈ {0-15}|(n≡i (mod 16) ∃ i ST.PS)}.

(iii) I.ST=ST.

(iv) If I.ST.IP is true, then set ST.IP=false. An exception is that if PD is true and I.ST.DP<2, then leave ST.IP=true; this forces insertion of three padding NOPs in PD mode. Also, set I.ST.PI to reference an internal Src record representing a NOP instruction.

(v) If I.SP.IP is false, increment ST.PC. Set ST.PI=$P_{ST.TI+1}$ if it exists, else (null).

(vi) Set I.PL=the set of all possible lengths of encodings of instruction $P_{I.PI}$. There is always at least one element, which would be the standard encoding of the instruction as given in the software architecture manual. Additional, usually greater, lengths can be found, depending on the particular instruction and the skill and knowledge of the implementer of the process. For the NOP instruction, I.PL=the range {1-11}.

(vii) Set ST.PS and I.PE=the set of all numbers that are the sum of some number in I.PL and some number in I.ST.PS, but excluding any numbers>32, i.e, {n ∈ {0-32}|n=i+j ∃ i ∈ I.ST.PS, j ∈ I.PL}.

(viii) Set I.NM=the number of xops for the instruction. Use the decode type for the instruction as documented in the Instruction Latencies appendix in the Optimization Guide. DirectPath Single is 1, DirectPath Double is 2, VectorPath is 3 or more. The actual number of xops for a VectorPath instruction can be determined by the implementer of this process by measuring the performance counter event called Micro Ops Dispatched. However, this will only have an effect on execution simulation, and if simulation is not actually employed, then I.NM=3 will suffice.

(ix) Note that if the process will be used to evaluate a program produced by a particular program generator, then I.PL and I.NM will need to be implemented only for program instructions actually produced by that generator.

In step 347, the variable M is set to refer to a new Macr record at the end of ML. Set M.I=I. Set M.N=the number of Macr records on ML so far (including M itself), that refer to I. Set M.DC=ST.DC and M.DP=ST.DP. If M.N=1, set I.M=M.

In step 348 ("Advance Dispatch"), the field ST.DP is incremented, and if ST.DP=3, then set ST.DP=0 and increment ST.DC. In step 349, if ST.DC≤ODC, then the Tick process 340 is done.

In step 350 ("New Cycle"), for each Macr m in ML such that m=ODC, set M0, M1, or M2 (corresponding to m.DP) =m.

In step 351, if ST.PS is {empty}, then step 329 is performed. If ST.PS is not empty, then Tick subprocess 340 is done. Step 352 is a rollback operation for a NOP. A program padding Instruction is needed. Therefore, set IP=true, and invoke step 332 Rollback, designating instruction number I.ST.PC. This removes the Instr and Macr just added. Also, if PD is true, repeat this Rollback as needed until ST.DP=0.

Figure 3E:
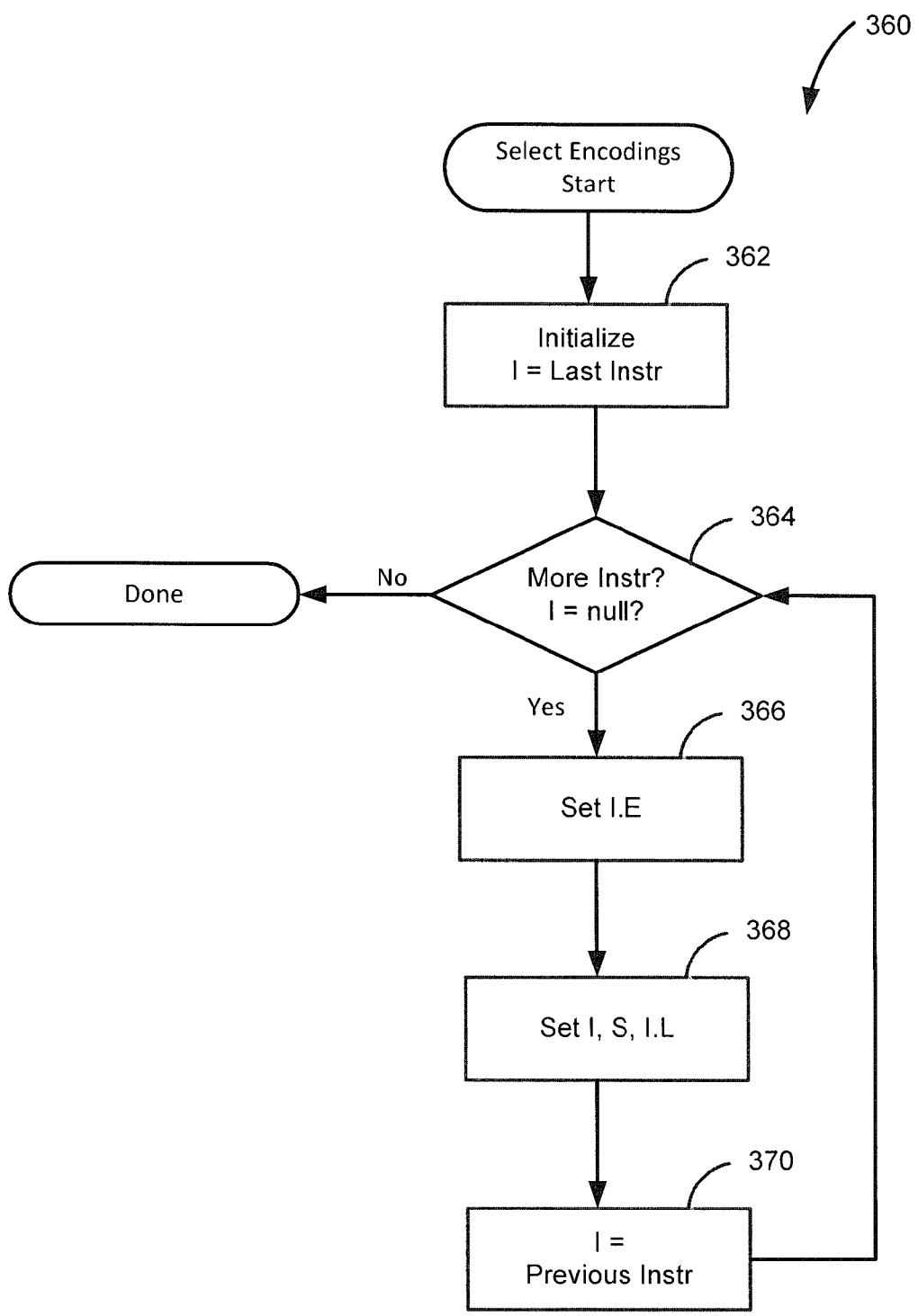

Referring now to FIG. 3E, an iterative subprocess 360 for selecting encodings is shown in more detail. The subprocess is initialized in step 362 by setting the variable I=the last Instr in IL (if any). Step 364 begins the loop iteration. If variable I is (null), then process 340 is done. If the variable I has a value other than (null), then if I is the last Instr in IL, I.E=an arbitrary member of I.PE. If not, then let ni be the Instr following I in IL. If ni.GS is true, then set I.E=any member of {ni.S, ni.S+16, ni.S+32}∩ I.PE. Otherwise set I.E=ni.S. Note that the method for setting ni.S guarantees that I.E will be a value ∈ I.PE.

In step 368, set I.L and I.S to values such that I.L ∈ I.PL, I.S ∈ I.ST.PS and I.L+I.S ∈ PE. Note that the method for setting I.PE guarantees that values for I.L and I.S exist. In step 370, set I=the Instr preceding I, if any, or else (null), then return to step 344.

Figure 3F:
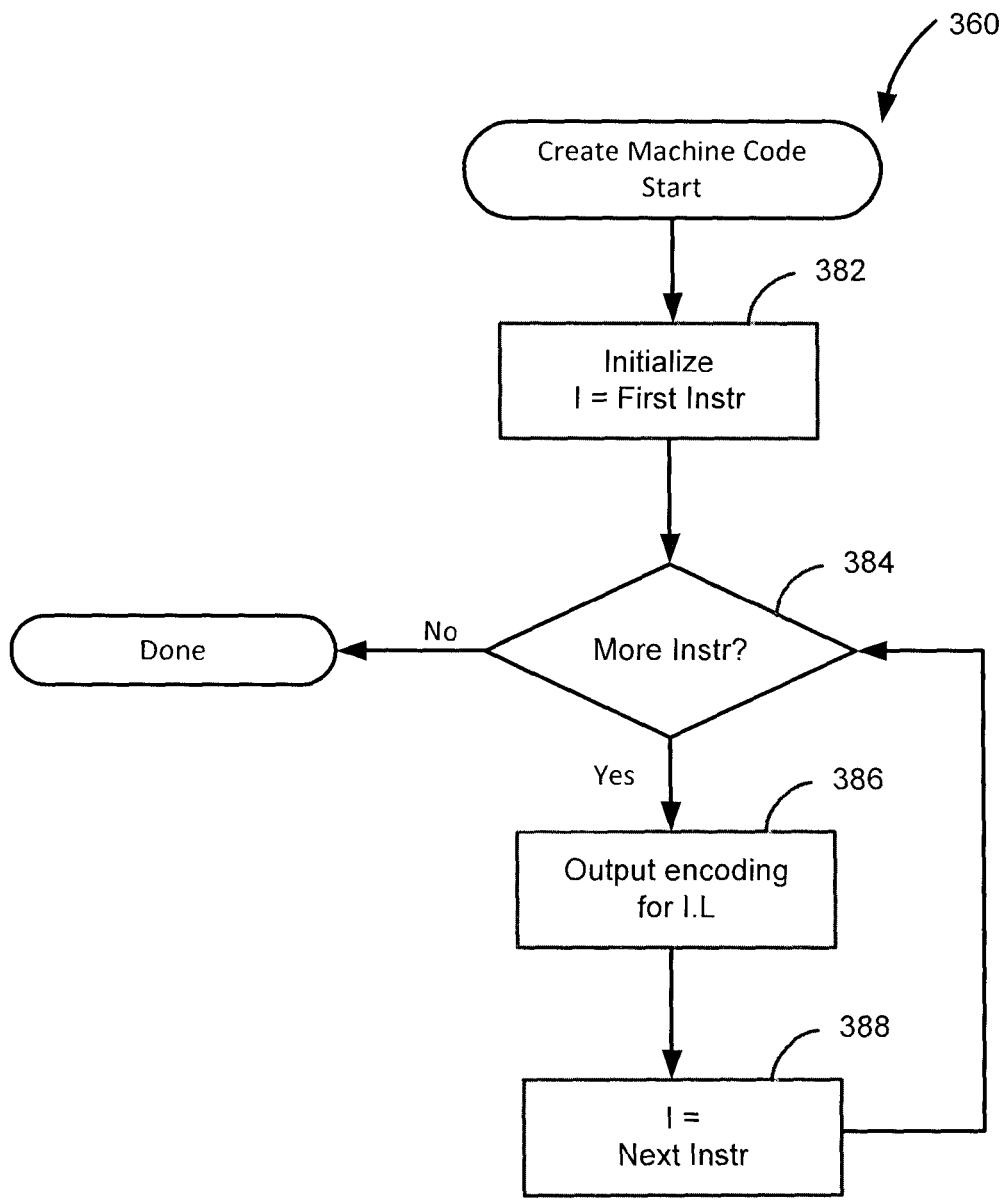

Referring now to FIG. 3F, the subprocess 380 for creating machine code is shown in more detail. First, it is assumed that process 300 includes some method to store the resulting machine code, given encodings for sequential instructions. In step 382, set I=the first Instr in IL (if any). In step 384, if I is (null), the process 380 is done.

In step 386, an instruction encoding is selected for I.PI which has a length of I.L. This encoding is stored in the output machine code. Note that the method of setting I.PL, and the fact that I.L ∈ I.PL, guarantee that such an encoding exists. Finally, in step 388, set I=the Instr following I, if any, else set it to (null), then return to step 384.

4. Ramifications of the Conversion Process

The number of dispatch pipes varies with the target. For example, the K15 can dispatch 4 xops per cycle.

Targets other than K10 have their own particular rules for the existence of dispatch bubbles (step 345) and the number of xops for a particular instruction (step 346). On the K15, for example, the decoder will decode a maximum of two load uops and one store uop (actually, the xops that produce these uops) in any clock cycle. If the xop would exceed this limit, it is delayed until the first slot in the next cycle, resulting in one or more dispatch bubbles.

Some targets cannot sustain the maximum number of new decoder windows per cycle. For example, K10 has a maximum sustained rate of 5 32-byte fetch buffers every 6 cycles, and K15 has a maximum sustained rate of 7 32-byte fetch buffers every 10 cycles when only one core of a compute unit is running. On the K10 it would be very unusual for a program to have long enough instructions to run into this limit. However, programs on K15 that heavily use the XMM (and not the new YMM) operations will likely exceed it.

When the limit is reached, the result will be an occasional cycle in which only the first decoder window, or no decoder windows at all, are available, resulting in dispatch bubbles. Steps in the process 300 to deal with these situations have been omitted for simplicity of explanation.

In step 364, in the first loop iteration, selecting an arbitrary initial value for I.E may result in program encodings that, while they are dispatched in the shortest possible time, will not occupy the smallest possible total number of dispatch windows. This may matter when the added dispatch window takes more time to obtain from the fetcher. The way to also minimize the number of windows would be to alter Process 340 such that for each possible instruction start offset, it also maintains the smallest possible number of windows used so far. This information can be propagated forward through the program. Then step 364 will select a value for I.E that has the minimum number of windows associated with it, and this information may be propagated backward through the program.

The K15 shares one decoder with two cores, if both cores are running at the time. This affects the dispatch timing on each core, and analysis of program execution needs to take this into account.

All of these ramifications are contemplated as possible embodiments of the process. It is expected that one skilled in the art can work out the details in order to implement them.

5. AMD K10 Processor

Figure 4:
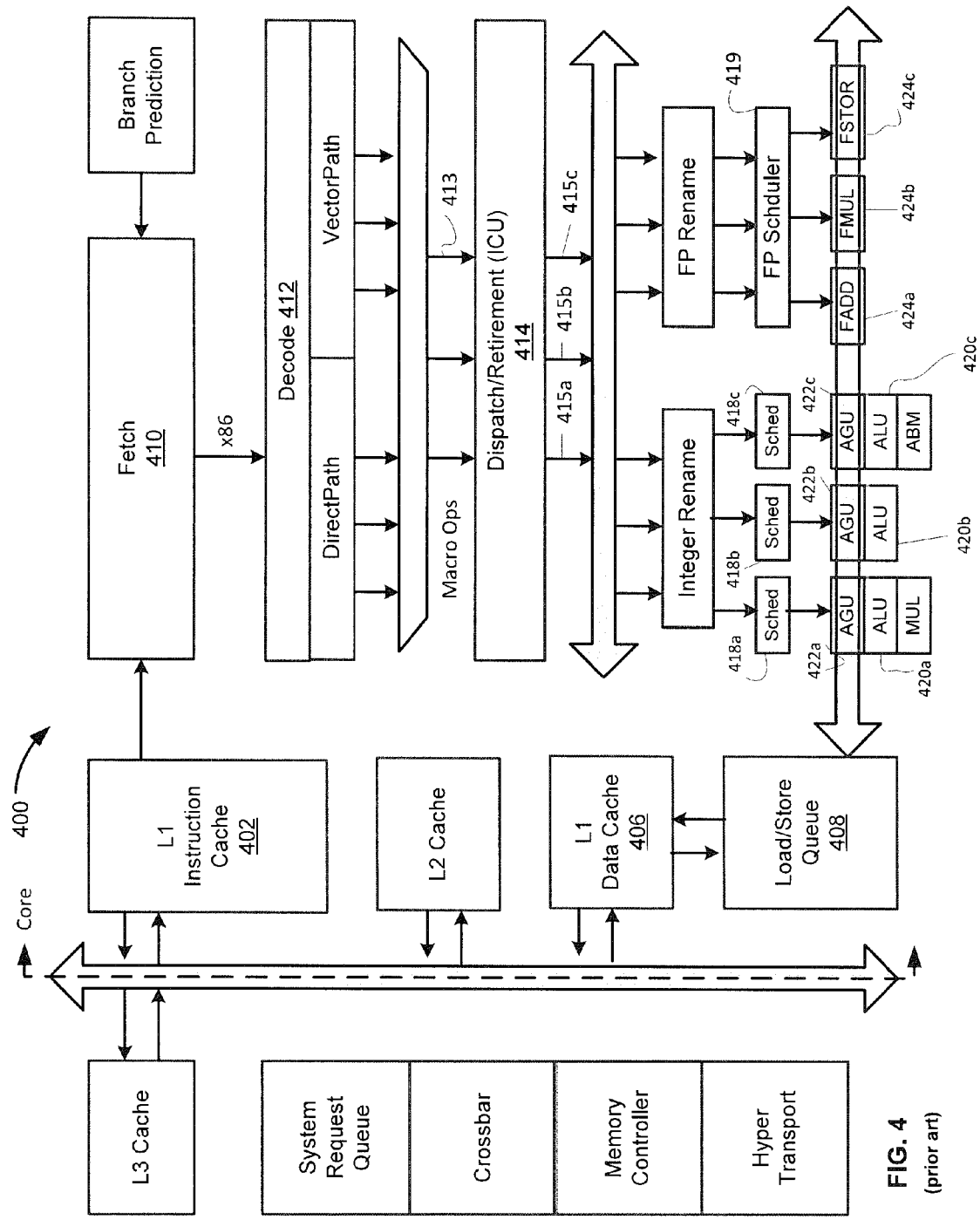
FIG. 4 is a block diagram illustrating the core structure of the AMD K10 processor.

FIG. 4 illustrates an embodiment of the physical logic and circuit elements that form the CPU core 400 for the K10 processor. Additional information regarding this processor can be found in U.S. Pat. No. 6,473,832 and the Optimization Guide, both of which are expressly incorporated herein by reference. Other AMD processors share similar characteristics. This section describes the relevant architecture of the K10 processor, and the remaining sections describe embodiments of methods that refer to the K10 architecture. However, such descriptions are intended to be illustrative and not limiting.

The core 400 includes a number of caches, the details of which are provided in the Software Optimization Guide. In relevant part, the L1 instruction cache 402 provides instruction bytes to the decoder 412, and the L1 data cache 406 transmits data to and from the load/store queue 408 on its way to and from the execution units. The decoder unit 412 generates xops 413 that are further sent on to the instruction control unit (ICU) 414.

A simplified description of the decoder 412 has the decoder 412 receiving instruction bytes from the instruction cache 402, and after a few pipeline stages, these instruction bytes are turned into a pair of 16-byte windows, each corresponding to 16 instruction bytes aligned on a 16-byte boundary. The decoder 412 has an instruction address, which is located in the first window. It will scan for the next instruction(s) that are wholly contained in the two windows, convert them to some xops, send (dispatch) the xops to the execution unit, and advance the instruction address past the scanned instructions. The decoder 412 is limited to dispatching three xops per cycle. Sometimes fewer xops are dispatched because not enough instructions are contained within the two windows (see prior discussion of FIG. 2).

The instruction control unit ("ICU") 414 is the control center for the AMD processors, and is responsible for the following functions: xop dispatch, xop retirement, register and flag dependency resolution and renaming, execution resource management, interrupts, exceptions, and branch mispredictions. The ICU 414 takes the three xops that are produced during each cycle from the decoders and places them into a centralized, fixed-issue reorder buffer (not shown) that may be part of the ICU. The reorder buffer is organized into 24 lines of three xops each. The reorder buffer allows the ICU 414 to track and monitor up to 72 in-flight xops. The ICU 414 can simultaneously dispatch multiple xops from the reorder buffer to both the integer schedulers 418*a*, 418*b*, 418*c* and the floating point scheduler 419 for the final decoding, issue and execution as uops. The scheduling units in turn can simultaneously issue up to nine uops to the three general purpose integer execution units (ALU's) 420*a*, 420*b*, 420*c*; three address-generation units (AGU's) 422*a*, 422*b*, 422*c*; three floating-point execution units 424*a*, 424*b*, 424*c*; and the load/store queue 408.

6. Simulation of K10 Processor State

It is important to be able to simulate the internal state of the processor. Input to a simulator module consists of a list of machine instructions representing the program instructions. These instructions are exemplified by the "Src" 301 record structure in FIG. 3B.

The simulation begins with a given internal state, with an instruction pointer at the first instruction. The behavior of the processor is simulated over successive clock cycles, and for each cycle, the state of the processor is updated, with an indication of which xops are dispatched each cycle.

The simulator can thus be used to evaluate the performance of the processor for different encodings of the program instructions or different programs that produce the same overall result. Process 300 without simulation is sufficient in itself to optimize the speed of decoding of a particular program. Simulation is used to evaluate performance factors other than decoding, and it depends on process 300 to produce a schedule of xop dispatches. In that way, an optimum program and encoding can be assigned that maximizes efficient performance of the program.

Simulation is particularly important in the optimization of the K10 load/store unit. As will be detailed later, the load/store behavior is highly dependent on both the exact schedule of load and store uop dispatch and on the time required for xops to be retired. Therefore, both of these elements must be simulated in order for a program generator to choose a particular program that gets optimal throughput from the load/store unit. If the retire times are not perfectly simulated, then at least an upper bound or a conservatively high estimate of the retire time should be produced.

7. Method for Issuing Instructions

A key objective for the program generator is to issue instructions in such a way as to optimize the performance of both the decoder and the load/store unit. It is thus important that the program generator associate each instruction with a specific processor clock cycle. The performance of the load/store unit is different, and on the K10 sometimes greatly so, if two instructions are dispatched in the same clock cycle versus being dispatched in two consecutive clock cycles.

Thus, a process can be used to determine all possible paths (or at least multiple paths) for coding the instructions.

At the beginning of the generated program, or at any point where two or more code paths reach the same instruction, the program generator must know exactly at which issue position the decoder will issue the next instruction. If all code paths to the same instruction will lead to the same issue position, then this is accomplished. The program generator can achieve this by arranging the code so that the branch instructions are all issued in the previous issue position (modulo 3). If this is not the case, then the program generator will have to issue one of the instructions that force the issue position sequence. This includes the first instruction being generated. The best choices are:

LZCNT/POPCNT reg, reg, if reg is an available register. These are dispatched to pipe 2.

XCHG AL, AL, if no register is available. This takes up two entire decode cycles. The next xop will be dispatched to pipe 0.

MUL/IMUL, if a register is available. The generated code might have use for this instruction anyway. This instruction's xop is dispatched to pipe 0.

8. LSI Simulation (K10)

Memory reference instructions (uops) are passed to the load/store unit in the same cycle that they are dispatched from the decoder, but only the type of operation is specified (load, store, or load-modify-store). The virtual address of the data will be provided later, when it is calculated by one of the AGU's.

The load/store unit in the K10 processor actually consists of two stages, called LS1 and LS2. LS1 holds memory uops, in program order, until their addresses are known, and then completes them in program order. Completing a uop by LS1 means presenting it to LS2 and simultaneously presenting the virtual address to the L1 data cache. If data for a load uop is available from the L1 data cache, the data is then forwarded to the execution units.

LS1 can accept up to 3 uops per cycle, so there is no limitation on memory instructions in a decode group. LS1 can complete up to 2 uops per cycle. LS1 can hold up to 12 uops altogether. Each uop resides in LS1 starting from the cycle in which the instruction is dispatched, up to and including the cycle in which it completes.

There is a flow control mechanism to prevent LS1 from overflowing. If the population of LS1 reaches 10 uops or more, a signal is presented to the decoder which halts further xops from being dispatched. When the population reaches 9 or fewer, the signal is withdrawn, and then the decoder may begin dispatching xops on the following cycle.

The ideal timing processing a uop is as follows:
a. Cycle 1 Dispatch: Instruction is issued by the decoder, and the op is entered into LS1. The uop is counted as part of the population from this point forward.
b. Cycle 2 AGU Op: Address generation is performed (if possible), and the address is presented to LS1.
c. Cycle 3 DC Access: Address is accepted by LS1 and stored along with the op. The address is then presented to the L1 cache.
d. Cycle 4 Response: Uop is completed. Data (for loads) and status are presented to the execution units. The entire uop and its status are presented to LS2.
e. Cycle 5 Delete: Uop is removed from LS1, and no longer counted as part of the population.

As usual, a number of things go wrong with ideal timing. For example, AGU Op may be delayed because address generation has not yet been performed. In this case, DC Access, Response, and Delete will be delayed until the AGU Op does occur. AGU Op will occur as soon as (a) the index and/or base registers have their values available, and (b) there is no earlier AGU uop in the same dispatch position that can be performed at that time.

DC Access may be delayed if there are two earlier uops in LS1. LS1 will still accept the address from the AGU one cycle after the AGU Op, but will not present it to L1 until the uop is one of the two earliest uops in LS1. Response and Delete will then be performed in the subsequent two cycles.

An accurate simulation of LS1 requires an accurate simulation of the AGUs and of all integer (ALU) operations that the AGU operations are dependent upon.

The decoder will stall if the population reaches 10 or more, which means the total of all uop in the Dispatch through Response stages above. This covers at least 4 dispatch cycles. Thus, a general rule is that if there are 10 memory uops dispatched in any 4 consecutive cycles, there will be a stall in the following cycle. If any AGU Ops are delayed, a stall could occur sooner.

Interestingly, an LS1 stall can be advantageous, even if it can be avoided by better placement of the memory uop. The reason is that any dispatch stall will reduce the time of subsequent instructions (from their dispatch time) to retirement by one cycle, and this is advantageous for LS2 (see below). In fact, the program generator could choose to deliberately issue "too many" memory uops in order to create the stall. Of course, the stall will displace three instructions, but this will not necessarily increase the time required to execute the program.

The end result of simulation of LS1 is that the simulator will know which ops are presented to LS2 each cycle, and any LS1 dispatch stalls that will occur.

9. LS2 Simulation (K10)

LS2 is a 32-deep buffer that holds memory uops in progress after they leave LS1. A key element of LS2 behavior is the flow-control mechanism between LS2 and LS1. When LS2 determines that it is full (or rather, that it may overflow soon if LS1 continues presenting uops at a rate of two per cycle), it signals LS1 to stop completing uops for the time being.

The problem with the flow control method as implemented in the K10 is that, as shown by experimentation, the processor typically loses two or three cycles of L1 data cache throughput, even if only a one cycle interruption of LS1 would suffice to ease the overflow condition. Furthermore, it can take several more cycles before LS1 and LS2 return to their normal flow and predictability of timing. Therefore, it is crucial that LS2 full conditions absolutely be avoided, and this is a key feature of the described subject matter.

LS2 interfaces with both LS1 and the L1 cache. When a uop in LS1 is in the Response stage, that uop, along with its status from L1, is copied into LS2. There may be up to two such uops per cycle. If at least one uop is received, then LS2 allocates a pair of buffers to hold the uop(s). If only one uop is received, then the second buffer is unused, but it remains allocated and cannot be used for anything else.

If the uop is a store, LS will later present the store data to L1. This is called Store Completion. Store Completions occur in the same order as the corresponding instructions in the program. The x64 architecture requires that results not be committed to the data cache until the instruction, and all earlier instructions, are known to have completed successfully. Because of pipelining within LS2, Store Completion will not occur until at least 4 cycles after the store instruction is retired by the execution unit.

L1 has two ports so that it can perform two operations per cycle. The ports operate independently (except for the question of bank conflicts, which are discussed later). Each port can perform a load or store in the LS1 Response stage. The port can also perform a Store Completion from LS2 if it is not performing a load in LS1 Response. It is capable of performing a Store Completion and a store in LS1 Response at the same time.

Load Completion is when LS2 decides that a load op no longer needs to be held in its buffer. This will occur several cycles after the load is performed by L1.

This simplified model is sufficient for the analysis of LS2 Full conditions that are specified below. Additional things that may occur include:

a. Bank conflicts. Detailed information may be found in the previously cited Optimization Guide. A conflict may occur between two loads, a load and a Store Completion, or two Store Completions (these latter two cases are not mentioned in the Optimization Guide). The effect of a bank conflict is that L1 performs the two uops over two cycles instead of one. LS1 uops are blocked from entering the Response stage during the second cycle.

b. Load misses. If the requested load address is not contained in L1 at the time, a DC Miss status is returned. At a later time, when L1 notifies LS2 that the address is now in the cache, L1 will perform the load again (but this time the op comes from LS2 instead of LS1). This will block one uop in LS1 from entering the Response stage and delay Load Completion. It is also a loss of L1 bandwidth.

c. Store/load forwarding. If a load uop partially matches the address of an earlier store that is now in LS2, LS2 will try to supply the load data from the store uop, instead of reading it from L1. It will still occupy the L1 port. This may be unsuccessful for various reasons, and if so, there will be various delays in performing the load, as well as loss of L1 bandwidth. A successful forwarding will have no impact on LS1 or LS2 timing.

Avoiding these problems may be beyond the ability of the program generator. At the least, it will need information about the alignment of memory addresses involved or some other sort of hints. More likely, it will require some careful planning by the author of the source code. For purposes of avoiding LS2 Full conditions, the simplified analysis method assumes either that these anomalies will not make LS2 Full more likely, or that they will cause more delays than LS2 Full would cause.

10. Lifetime of Ops in LS2 (K10)

As mentioned above, LS2 uop buffers are organized in 16 pairs. One pair is allocated whenever at least one LS1 uop is in the Response stage. The pair is deallocated when each of the buffers is either unused, or its uop has reached Load Completion or Store Completion.

Because of different life cycles of loads and stores, the most efficient use of LS2 buffers happens when loads and stores are paired. That is, for each cycle, LS1 has either two loads, two stores, or nothing, in the Response stage. The Optimization Guide makes this recommendation, but does not explain any rationale, nor does it specify that pairing should also be synchronized with dispatch cycles. In fact, if a program contains alternating pairs of loads and stores, but the dispatch groups overlap these pairs, then each cycle will have a load and a store in Response, which will be very inefficient. It should be noted that a 16-byte store instruction is dispatched as two 8-byte store uops.

11. Simulation of the LS2 Full Condition (K10)

Because buffers are both allocated and freed in pairs, the population of LS2 is always an even number from 0 to 32. When the population reaches 30, an LS2 Full condition is signaled.

The following is a method for simulation of the LS2 Full condition. This is a simplified method, which is limited to programs in which LS1 completes either two loads, two stores, or no uops at all, during each cycle. It assumes that for two store uops, both of the stores retire at the same time (meaning either that they are the two 8-byte parts of a 16-byte store, or that they were separate 8-byte store instructions that were dispatched at the same time). The simulation also does not simulate LS1 or LS2 behavior after the first occurrence of LS2 Full. The method is verified from experimentation to accurately simulate LS2 Full under these conditions.

a. The input program will have to be such that these criteria are satisfied. It is possible to simulate "non-conforming" programs that do not satisfy these conditions, provided that sufficient information to model the behavior of LS2 for such programs is known. It can be argued that a non-conforming program will perform little or no better than if the program were made to be conforming (even if it means adding redundant loads, stores, or nops); but such argument is beyond the scope of the present disclosure.

b. The inputs for each cycle of the simulation are: (1) what LS1 uops are in Response stage (i.e., two loads, two stores, or nothing), and (2) whether the next two stores were retired exactly four cycles earlier. The symbols L, S, and N represent the three cases of LS1 Response (Load, Store, Nothing), respectively. The symbols R and –R represent the retired store input (delayed) or not, respectively. Also, each cycle will be given, as explained later, one of the symbols W and X, and one of the symbols F and –F.

c. The simulated state of LS2 consists of: (1) ST=number of stores that have been received previously but not yet completed, (2) SR=number of stores that have been received previously and retired, but not yet completed, (3) $P_{LSN}$=the entire sequence of L, S, and N symbols since the seventh previous cycle of L or S (including any N cycles), and (4) $P_{WX}$=the sequence of W and X symbols for the same range of cycles as for $P_{LSN}$.

d. The current cycle has the symbol X if SR>0 and it is either N or S. This means that LS2 completes the next two stores it is holding, and will delete their buffer. It has the symbol W otherwise.

e. The current cycle has the symbol F when it is the cycle after the sequence L $M^6$ (that is, L M M M M M M); and –F otherwise.

f. Next, an estimated LS2 population P is calculated for each cycle. The program starts with P=0. Then for each cycle, 2 is added for each L or S, and 2 is subtracted for each X or F. This will be the value of P for the start of the next cycle.

g. It is called an "estimated" population because after any F cycle, the actual population might be either P or P+2. This will remain true until after the next L or S. What this means is that each L is removed from LS2 after either six or seven M's.

h. At this point, if P<28, LS2 Full is false. If P=28 exactly, and it is L or S, and –F, LS2 Full is true. If P>28, there is definitely a full condition in LS2, but this could only happen if there was also a full condition the previous cycle.

i. The remaining case is P=28 and F. The actual population may be either 28 or 30. The following method will determine which case it is:

(1) Convert the sequence $P_{LSN}$ to a sequence $P_{LS}$ by deleting all of the N symbols. The Full or not Full status is a function of the two sequences $P_{LS}$ and $P_{WX}$, denoted by LF2 ($P_{LS}$, $P_{WX}$), which is defined recursively by the following steps:

(2) As a matter of notation, when the pattern for a sequence contains curly braces, i.e. {something}, then the symbols \1, \2, etc., denote the something within the first, or second, etc., pair of braces.

(3) If $P_{LS}$={. *} L, there are two cases. (1) If $P_{WX}$={. *} W W, then LF2=LF2 ($P_{LS}$\1, $P_{WX}$\1). (2) otherwise, LF2 is true.

(4) Otherwise, if $P_{LS}$={. *} S and $P_{WX}$={. *} X, then LF2=LF2 ($P_{LS}$\1, $P_{WX}$\1).

(5) Otherwise, if $P_{LS}$={. *} L {S+}, and $P_{WX}$={. *} W, then LF2=LF2 ($P_{LS}$\1 \2, $P_{WX}$\1).

(6) Otherwise, if $P_{LS}$ is not empty $P_{LS}$=S+, and $P_{WX}$=. * W, then LF2=falseand.

(7) Otherwise, $P_{LS}$ is empty, there are two cases. (1) If $P_{WX}$=.ˆ(3+), then LF2=false. (2) If $P_{WX}$ If $P_{WX}$=.ˆ(0-2), then LF2=true.

Note—there are also cases where $P_{LS}$ is not empty and $P_{WX}$ is empty, and in these cases LF2=false.

12. General Optimization Strategies for LS2 (K10)

The retirement time of instructions is very important in avoiding an LS2 full condition. The reason is that the longer it takes the instructions to retire, the longer they remain in LS2, and this has the effect of increasing the population of LS2. This problem is exacerbated by the fact that once the instruction retire time reaches a certain number of cycles, the only way to reduce the population would be if there is a stall in the decoder. Although this is still certainly better than having an LS2 full condition, the dispatch stalls still cost in program speed. These extra costs would be avoided by better scheduling of instructions to have a shorter retirement time.

If a particular instruction results in the LS2 full condition, then that instruction should not be chosen, and something else should be tried instead. There are various possible ways to handle this, depending on how the implementer of the program generator wants to prioritize the choices.

(1) Choose two store instructions instead of load instructions, or vice versa. If there is only one such instruction available, the load/store op may be duplicated by a dummy instruction with the same memory address.

(2) If an operand in memory is used in more than one once, it can be the memory operand of separate instructions, or it can be loaded into a temporary register, which will be the operand of the other instructions. This is a tradeoff between the number of load ops and the number of instructions. The program generator may try both ways to see which of them works better with LS2.

(3) Choose instructions with no memory uops. If there are not three such instructions available at the time, dummy NOP instructions can be issued. Analysis of the full conditions will reveal that a cycle of no memory uops will never result, by itself, in a full condition. With enough such cycles in all the critical places, a complete program can always be produced that avoids any full condition. However, the cost may be that some dummy NOPs are issued, meaning that the program might not be the fastest possible program.

(4) Consider the previous cycle as a failure. Then the program generator will backtrack to the previous cycle and consider alternatives for that cycle.

An aggressive optimization might try first to find a program that has the shortest possible execution time. This would be calculated based on the integer, floating point, and load/store resources required and their corresponding throughput rates. Failing that, it would try to find a program with a somewhat longer execution time, and so on, until at some point finding such a program. It could either have this program as its result, or it could search for programs of consecutively shorter execution times until finding the absolutely fastest program.

13. Load/Store Optimization Ramifications

Embodiments of the Load/Store optimization method for K15 and other target platforms are contemplated. One skilled in the art of designing such an embodiment would need enough knowledge of the load/store behavior on the target platform, such as would provide an accurate simulation of the timing (or at least come reasonably close).

On the K15, an effective method for optimization of code using the new AVX and FMA instruction sets involves the following: (a) Implement the program using 256-bit (YMM) values as much as possible. This makes the code shorter and will avoid the 22.4 byte per cycle limitations of the sustained decoding rate. (b) Do not store 256-bit values using the MOVAPD [mem], YMMn instruction, because each such instruction takes up two entire dispatch cycles. Rather, use the pair of instructions MOVAPD [mem], XMMn and VEXTRACTF128 [mem+16], YMMn; this allows the full bandwidth of the load/store unit to be used. (c) Load uops are not purged from LDQ, and their corresponding instructions are not retired, until both the address and data for all preceding store uops have been received by STQ. This can increase retirement time, leading to retire buffer dispatch stalls, and lead to dispatch stalls from LDQ becoming full. Placing some stores later in the program may reduce these effects. A simulation of the LDQ and STQ timing will determine when the stalls actually will occur, and this information can be used to produce faster functionally equivalent programs.

14. Conclusion

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. For example, nothing in this disclosure limits the methods of code performance improvement to being used by a compiler or other program that generates code. They can equally be used by an individual programmer doing "hand coding." Therefore, the scope of the appended claims should be accorded the broadest interpretation so as to encompass all such modifications and similar arrangements.

The invention claimed is:

1. A method of encoding a program for a target processor, comprising:
    receiving and storing a program having a plurality of program instructions;
    generating a plurality of possible instruction encodings for each of the program instructions, wherein at least some of the possible instruction encodings for each program instruction have different lengths;
    fetching one of the possible instruction encodings into a fixed size decoder;
    converting, by the decoder, the instruction encoding into at least one execution operation;
    analyzing how many program cycles are required to dispatch the at least one execution operation from the decoder into an execution unit;
    identifying at least one execution operation dispatched during each program cycle;
    simulating the execution of the at least one execution operation dispatched during each program cycle, including delaying dispatch of at least one execution operation when a dispatch stall condition is simulated;
    repeating the steps of fetching, converting, analyzing, identifying and simulating with each possible instruction encoding until the number of program cycles required to dispatch the at least one execution operation corresponding to the instruction encoding is minimized; and
    selecting, for each program instruction, the instruction encoding that minimizes the number of program cycles used in the decoder.

2. The method of claim 1, further comprising applying program padding to one or more of the possible instruction encodings.

3. The method of claim 1, further comprising:
    receiving and storing a plurality of functionally equivalent programs, each of the functionally equivalent programs having a plurality of program instructions;
    performing the generating, fetching, converting, analyzing and repeating steps for each functionally equivalent program to select a program encoding with the minimum dispatch time for the functionally equivalent program; and
    selecting a final program encoding that minimizes the dispatch time over the entire set of the program encodings for the functionally equivalent programs.

4. The method of claim 1, further comprising changing the length of an instruction encoding, then repeating the steps of fetching, converting and analyzing.

5. The method of claim 4, further comprising increasing the length of an instruction encoding by instruction padding.

6. A method of encoding a program for a target processor, wherein the target processor includes a load/store unit coupled between an execution stage and a data cache, and comprising:
    receiving and storing a plurality of functionally equivalent programs;
    generating a program encoding for each of said functionally equivalent programs, each program encoding having a plurality of program instructions;
    simulating the execution of each program encoding, including simulating the encoding of each program instruction, simulating the loading of each encoded program instruction into a fixed length decoder, simulating the conversion of each encoded program instruction into at least one execution operation, simulating the dispatch of each execution operation into an execution unit, simulating the execution of the execution operations dispatched during each program cycle, simulating operation of the load/store unit, and further including delaying of dispatch of the execution operations when a dispatch stall condition is simulated;
    analyzing how many program cycles are required to dispatch the execution operations from the decoder into the execution unit;
    identifying at least one execution operation dispatched during each program cycle; and
    selecting one of said program encodings which has the minimum simulated time of execution.

7. The method of claim 6, the generating and selecting steps further comprising:
    generating a plurality of possible instruction encodings for each program instruction of each functionally equivalent program, wherein at least some of the possible instruction encodings for each program instruction have different lengths; and
    selecting, for each program instruction, the instruction encoding that minimizes the number of program cycles used in the decoder.

8. The method of claim 6, further comprising:
    rejecting any program encodings which result in a full condition in a LS2 buffer in a K10 processor at any point in the simulation; and
    employing program padding to ensure that at least one of the program encodings is not rejected.

9. The method of claim 8, the generating and selecting steps further comprising:
    generating a plurality of possible instruction encodings for each program instruction of each functionally equivalent program, wherein at least some of the possible instruction encodings for each program instruction have different lengths; and
    selecting, for each program instruction, the instruction encoding that minimizes the number of program cycles used in the decoder.

10. The method of claim 7, further comprising:
rejecting any program encodings which result in a full condition in a LS2 buffer in a K10 processor, at any point in the simulation; and
employing program padding to ensure that at least one of the program encodings is not rejected.

11. The method of claim 8, further comprising:
increasing the depths of a LS1 buffer and the LS2 in the K10 processor;
recording the simulated execution time of the selected program encoding of each program for the increased depths thereby providing a measure of the performance of the target platform for the set of programs.

12. The method of claim 7, further comprising:
increasing the depth of the load/store unit;
simulating the operation of the load/store unit using the increased depth;
rejecting any program encodings which result in a full condition in the load/store unit at any point in the simulation;
applying program padding to one or more of the possible instruction encodings to ensure that at least one of the program encodings is not rejected; and
recording the simulated execution time of the selected program encoding using the increased depth of the load/store unit.

* * * * *